United States Patent [19]

Asaoka et al.

[11] Patent Number: 5,250,330
[45] Date of Patent: Oct. 5, 1993

[54] LIQUID CRYSTAL DEVICE

[75] Inventors: Masanobu Asaoka, Yokohama; Yasuto Kodera, Fujisawa, both of Japan

[73] Assignee: Canon Kabushiki Kaisha, Tokyo, Japan

[21] Appl. No.: 780,288

[22] Filed: Oct. 22, 1991

[30] Foreign Application Priority Data

Oct. 25, 1990 [JP] Japan .................................. 2-285866

[51] Int. Cl.$^5$ ................................................ G02F 1/1337
[52] U.S. Cl. ...................................... 428/1; 428/473.5; 359/75; 359/78
[58] Field of Search ........................ 359/75, 78, 79, 77; 428/1, 473.5

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,655,561 | 4/1987 | Kanbe et al. | 350/350 S |
| 5,046,822 | 9/1991 | Matsuda et al. | 428/473.5 |

FOREIGN PATENT DOCUMENTS 56-107216  8/1981  Japan .

Primary Examiner—Alexander S. Thomas
Attorney, Agent, or Firm—Fitzpatrick, Cella, Harper & Scinto

[57] ABSTRACT

A liquid crystal device is formed by applying an alignment film comprising a polyimide which contains a structural unit represented by the following formula (I):

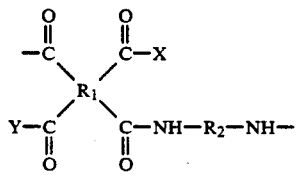

wherein $R_1$ denotes a tetravalent organic residue group, $R_2$ denotes a divalent organic residue group, X denotes $-NHR_3$ or $-OH$, $R_3$ denotes an alkyl group having 5-20 carbon atoms, Y denotes $-NHR_4$ or $-OH$, and $R_4$ denotes an alkyl group having 5-20 carbon atoms with the proviso that both X and Y cannot be $-OH$ and the $-OH$ in X or Y can be removed by further cyclization. The liquid crystal device thus formed shows a high contrast display, particularly by multiplexing drive, free from after-image because of quick responsiveness.

5 Claims, 5 Drawing Sheets

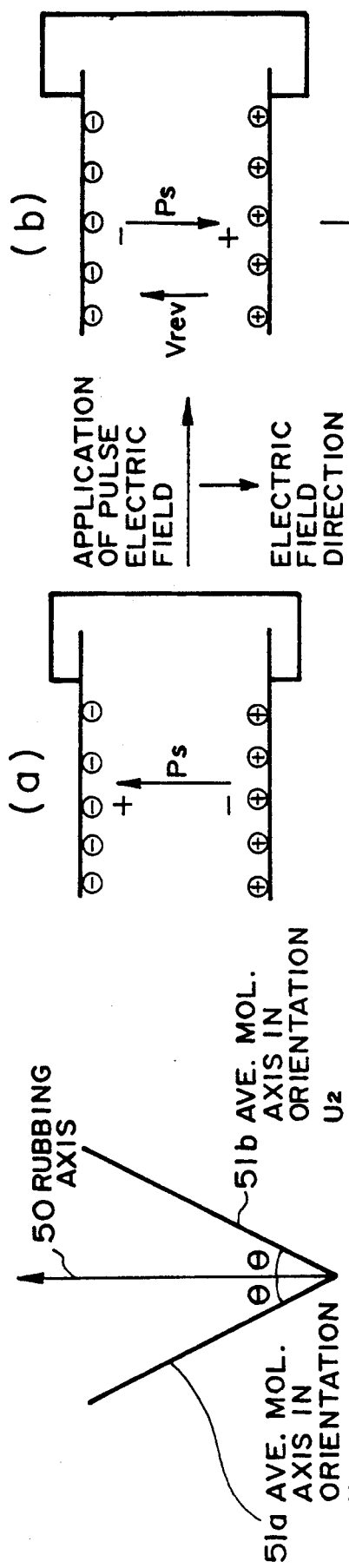
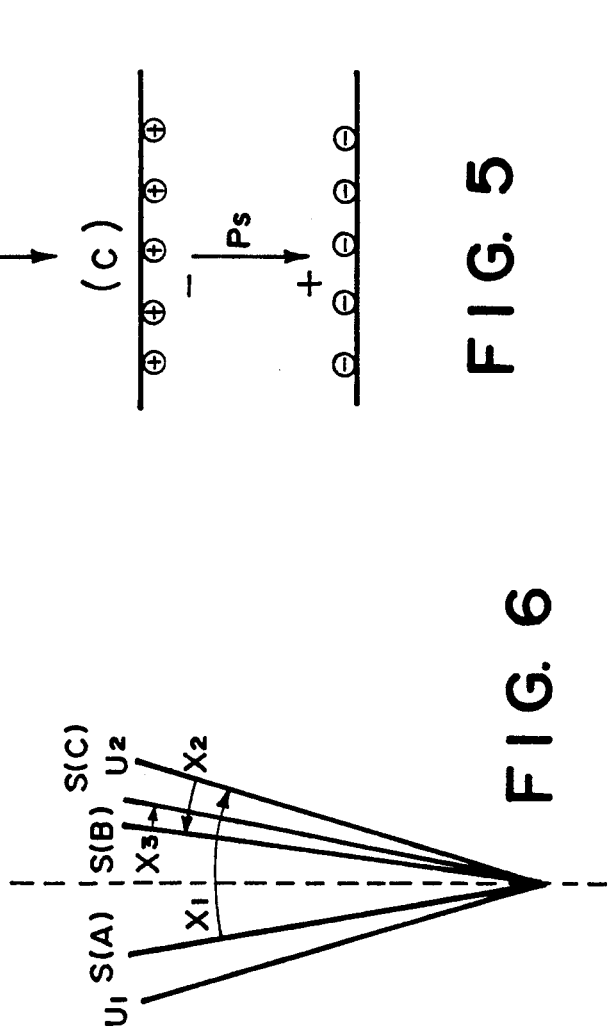
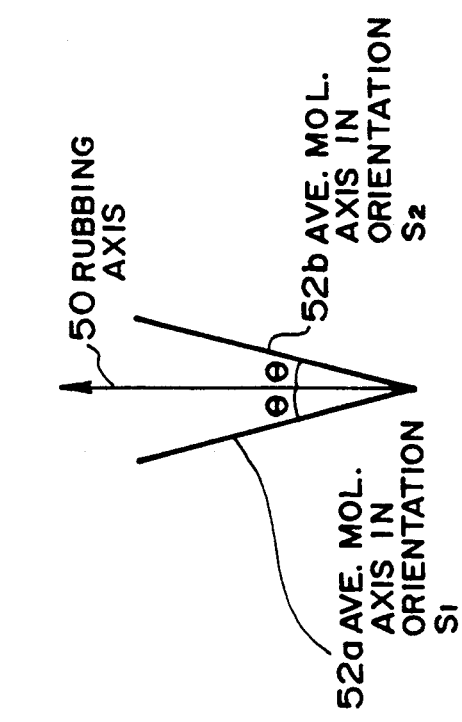
FIG. 4A
FIG. 4B
FIG. 5
FIG. 6

LIQUID CRYSTAL DEVICE

FIELD OF THE INVENTION AND RELATED ART

The present invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics thruogh improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta nd/\lambda)\pi,$$

wherein
- $I_0$: incident light intensity,
- $I$: transmitted light intensity,
- $\theta$: tilt angle,
- $\Delta n$: refractive index anisotropy,
- $d$: thickness of the liquid crystal layer,
- $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle $\text{\textcircled{H}}$ (the angle $\text{\textcircled{H}}$ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle $\text{\textcircled{H}}$ in a helical structure. More specifically, it has been found that the tilt angle $\theta$ in a non-helical structure becomes smaller than the tilt angle $\text{\textcircled{H}}$ because of a twist alignment of liquid crystal molecules in the non-helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

SUMMARY OF THE INVENTION

Accordingly, an object of the present invention is to provide a ferroelectric liquid crystal device having solved the above-mentioned problems, particularly a ferroelectric liquid crystal device which provides a large tilt angle of a chiral smectic liquid crystal in a non-helical structure and provides a display capable of displaying a high-contrast image and yet free from after-image.

According to a principal aspect of the present invention, there is provided a liquid crystal device, comprising: a pair of substrates and a chiral smectic liquid crystal disposed between the substrates; at least one of said pair of substrates having thereon an alignment film comprising a polyimide which contains a structural unit represented by the following formula (I):

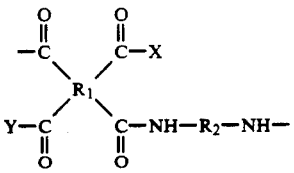

wherein $R_1$ denotes a tetravalent organic residue group, $R_2$ denotes a divalent organic residue group, X denotes —$NHR_3$ or —OH, $R_3$ denotes an alkyl group having 5-20 carbon atoms, Y denotes —$NHR_4$ or —OH, and $R_4$ denotes an alkyl group having 5-20 carbon atoms with the proviso that both X and Y cannot be —OH and the —OH in X or Y can be removed by further cyclization.

According to the liquid crystal device of the present invention, as the alignment film covering transparent electrodes and contacting the liquid crystal comprises a polyimide having a long alkyl side chain, it is possible to provide a high quality display showing a high display contrast between bright and dark states particularly at the time of multiplexing drive and free from unpleasant after-image.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A and 4B are plan views illustrating tilt angles $\theta$ in a uniform alignment state and a splay alignment state, respectively.

FIG. 5 is a sectional view showing a charge distribution, a direction of a spontaneous polarization $P_S$ and a direction of a reverse electric field $V_{rev}$.

FIG. 6 is a schematic plan view illustrating changes in tilt angle $\theta$ during and after application of an electric field.

DETAILED DESCRIPTION OF THE INVENTION

Figure 1:
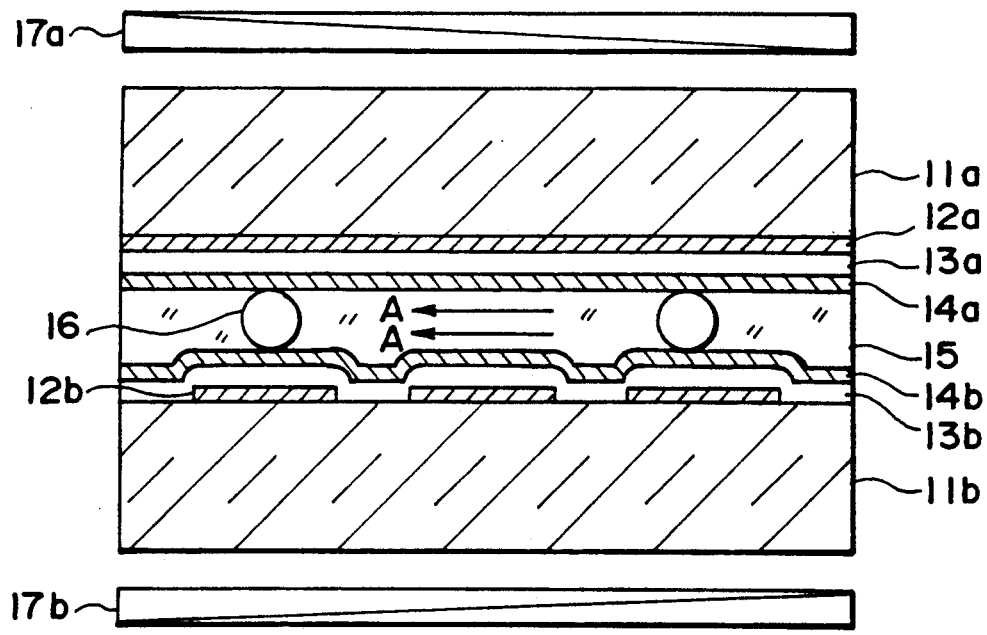
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates glass plates) $11a$ and $11b$ which are coated with transparent electrodes $12a$ and $12b$ of $In_2O_3$, ITO (indium tin oxide), etc., 200-1000 Å-thick insulating films $13a$ of $SiO_2$, $TiO_2$, $Ta_2O_5$, etc., and 50-1000 Å-thick alignment control films $14a$ and $14b$ of the above-mentioned fluorine-containing polyimide.

In this instance, the alignment control films $14a$ and $14b$ have been treated by rubbing in directions which are parallel to each other and in the same direction (indicated by arrows A in FIG. 1). A chiral smectic liquid crystal 15 is disposed between the substrates $11a$ and $11b$, and the spacing between the substrates $11a$ and $11b$ is set to provide the liquid crystal layer 15 with a thickness (e.g., 0.1-3 microns) which is sufficiently small to suppress the formation of a helical structure of the chiral smectic liquid crystal 15 by disposing spacer beads 16 of, e.g., silica, alumina, etc. between the substrates $11a$ and $11b$, whereby the chiral smectic liquid crystal 15 assumes a bistable alignment state.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive.

The polyimide having a structural unit represented by the formula (I) constituting the alignment film according to the present invention (hereinafter sometimes simply referred to as the "polyimide" or "polyamideimide" according to the present invention) may for example be prepared by adding a long-chain alkyl amine ($CH_3(CH_2)_nNH_2$) to a polyamic acid as a precursor to a polyimide and subjecting the mixture to cyclization under heating. Alternatively, it is possible to prepare the polyamideimide by adding a long-chain alkylamine as a monomer component into a mixture of a carboxylic anhydride and a diamine for condensation and subjecting the resultant polyamic acid or polyamide acid to cyclization under heating. It is also possible to subjecting a mixture of an ordinary polyamic acid as a precursor to a polyimide, preferably a fluorine-containing containing one, and a polyamic acid having along-chain alkyl-amide branch to cyclization under heating.

Examples of the tetravalent organic residue group $R_1$ in the formula (I) may include the following:

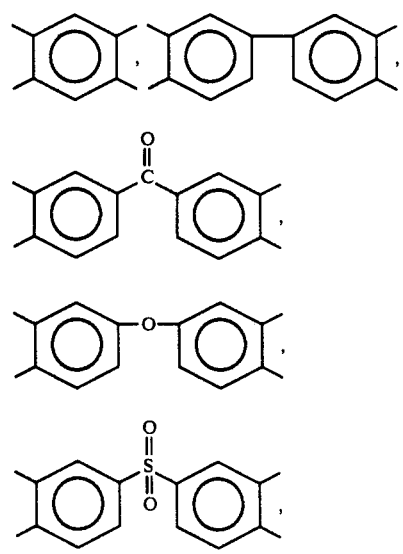

-continued
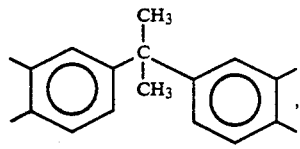
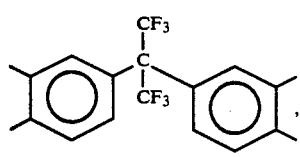
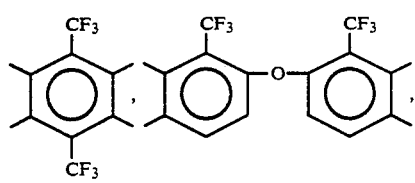
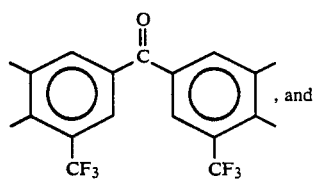
, and
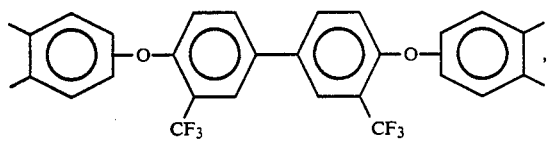
Further, examples of the divalent organic residue group R₂ may include the following:
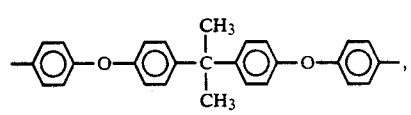
-continued
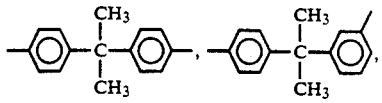
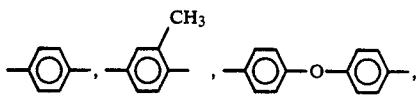
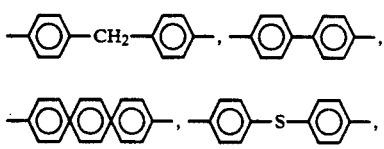
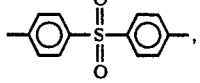
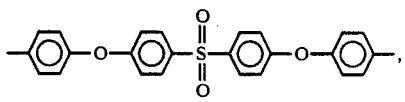
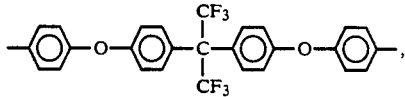
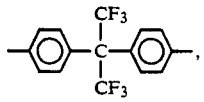
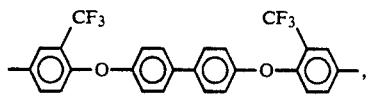
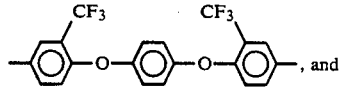, and
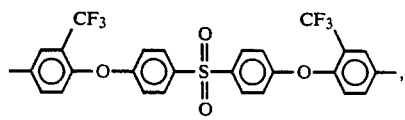
Herein, examples of the polyamideimide represented by the general formula (I) and constituting the alignment film according to the present invention are enumerated by their structural formulae:

(1) 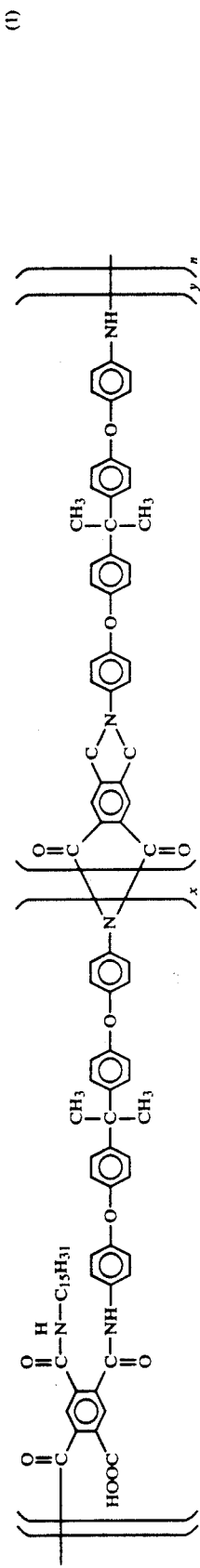
(2) 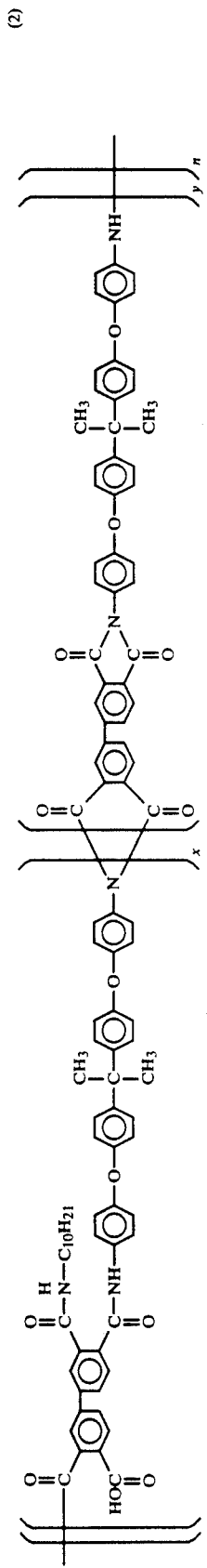
(3) 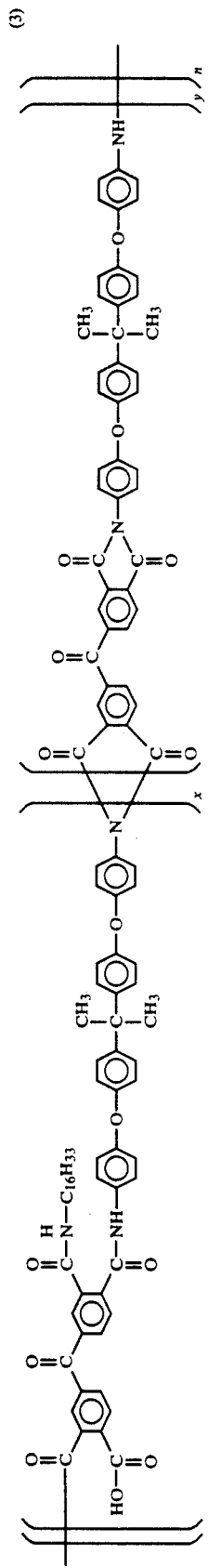
(4) 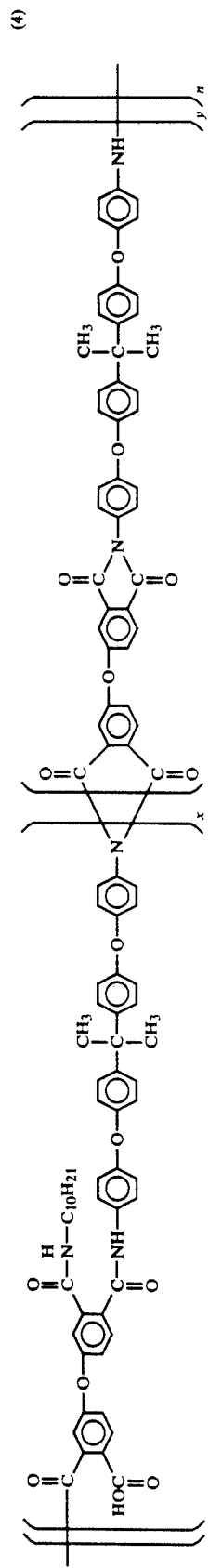

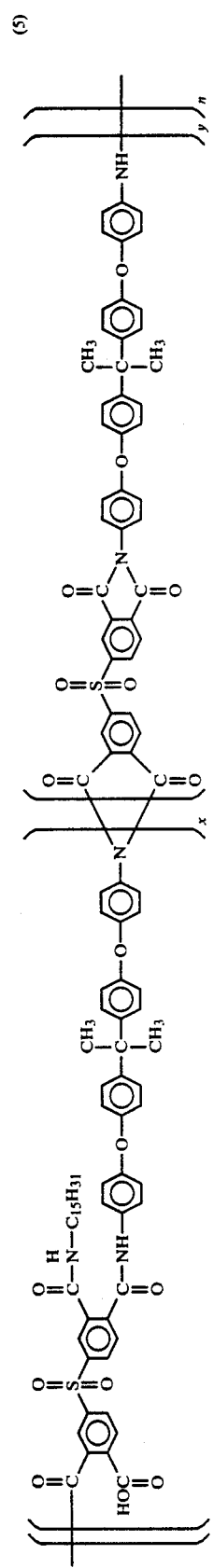
(5)
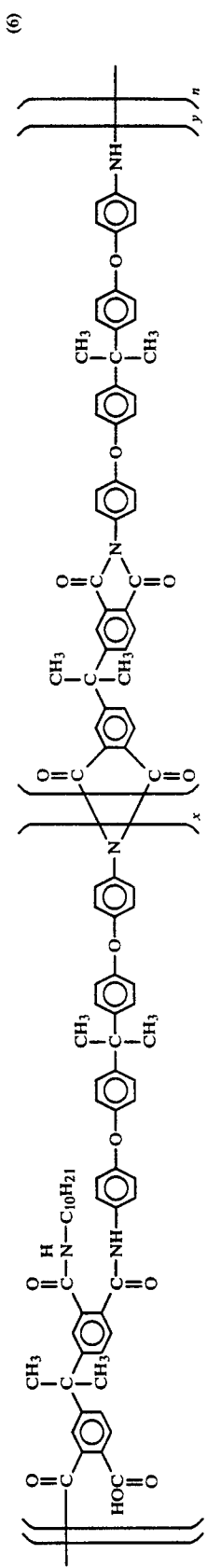
(6)
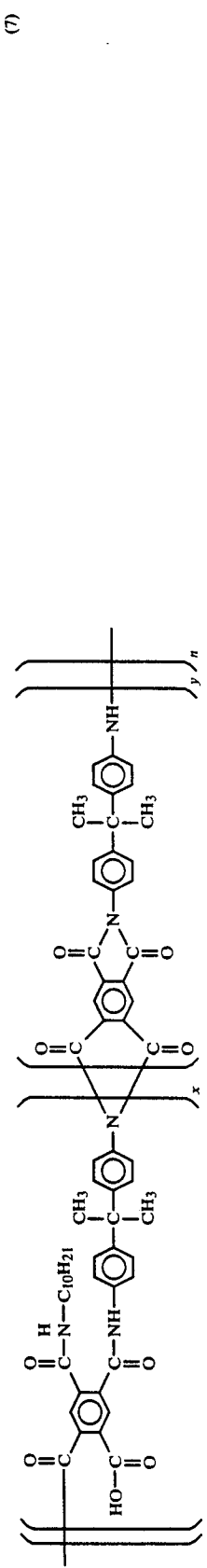
(7)
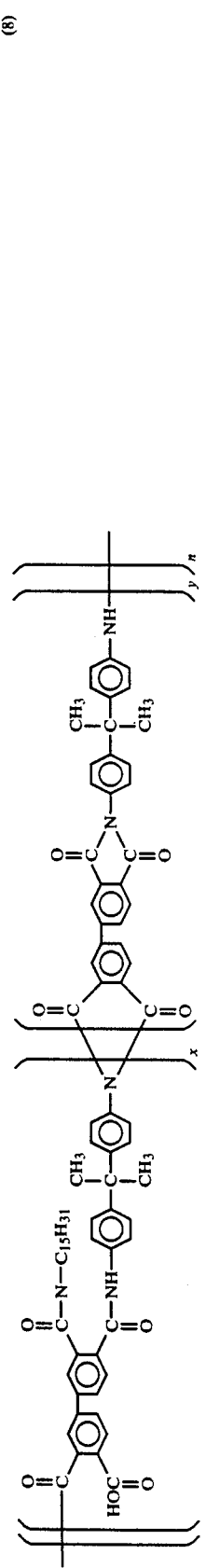
(8)

(9) 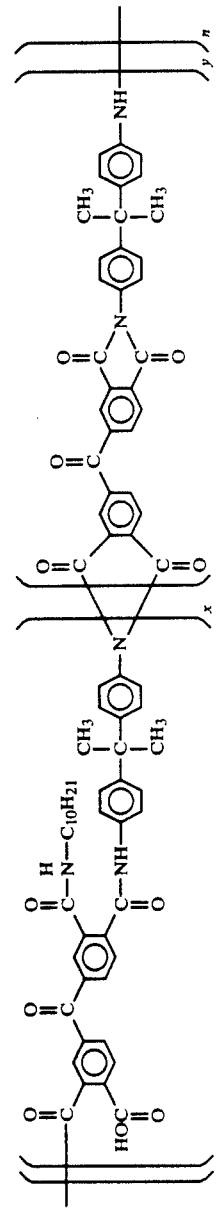
(10) 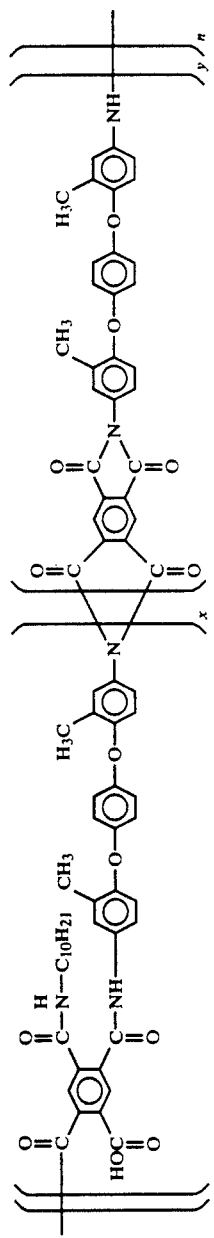
(11) 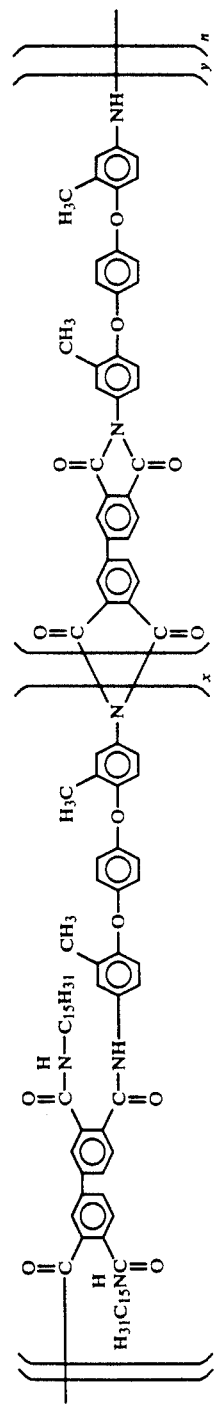
(12) 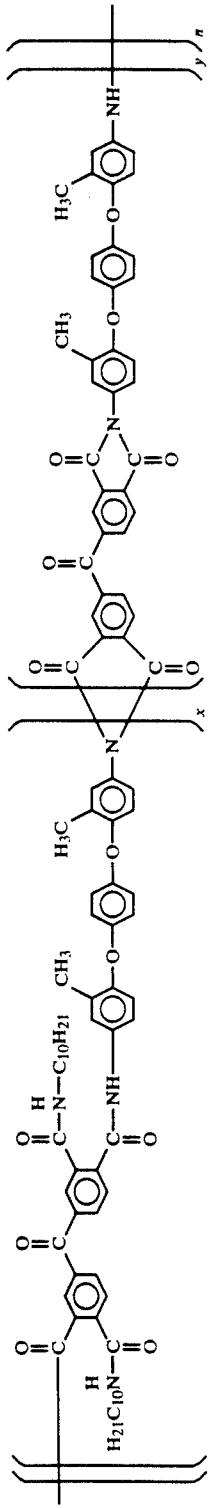

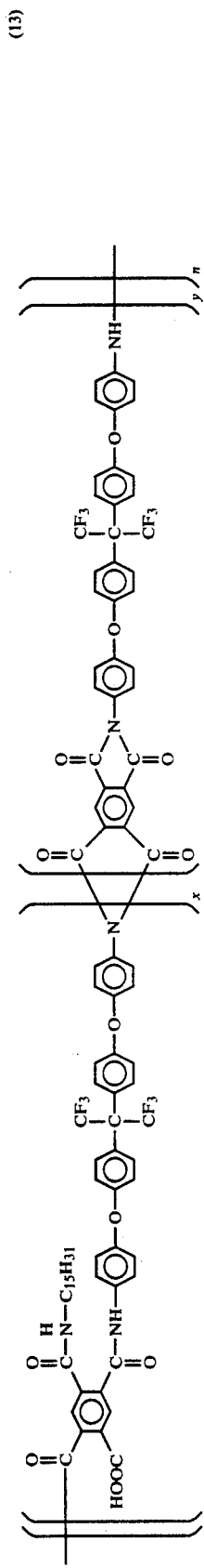
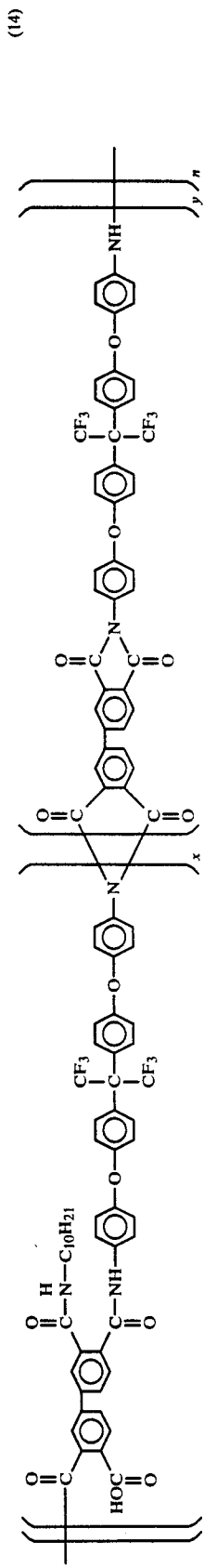
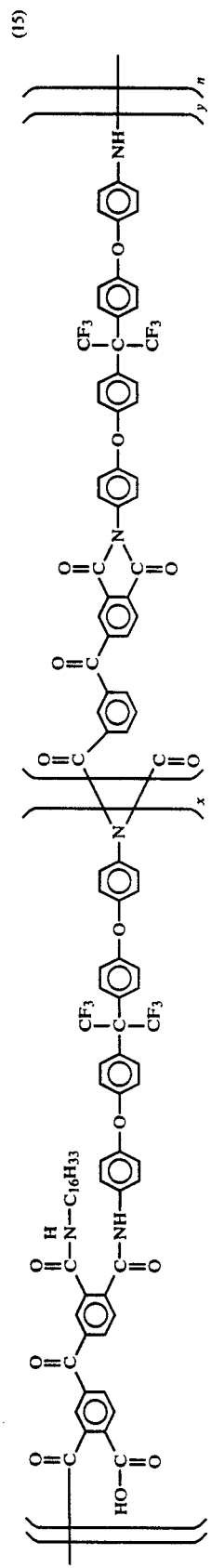
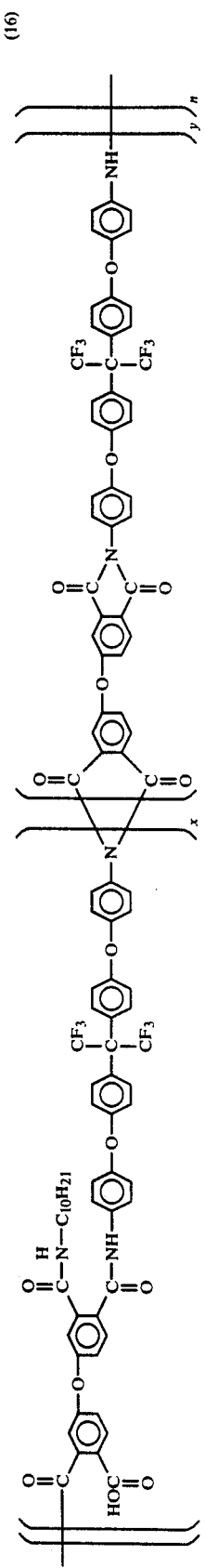

-continued
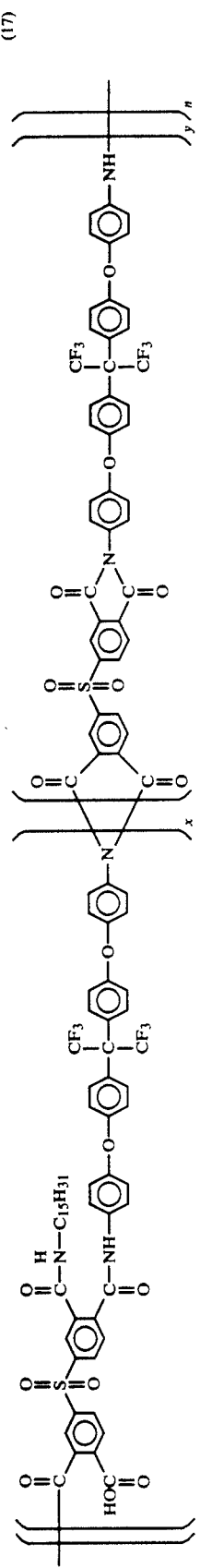
(17)
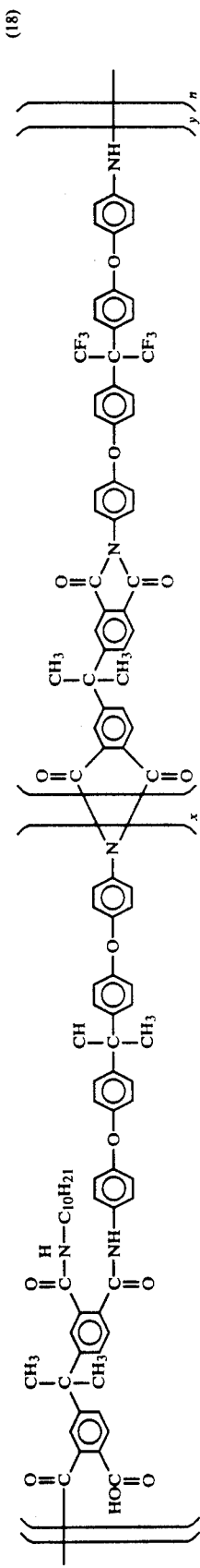
(18)
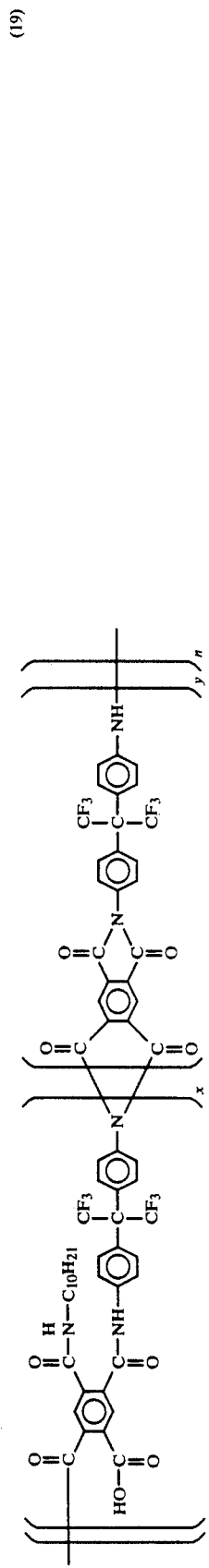
(19)
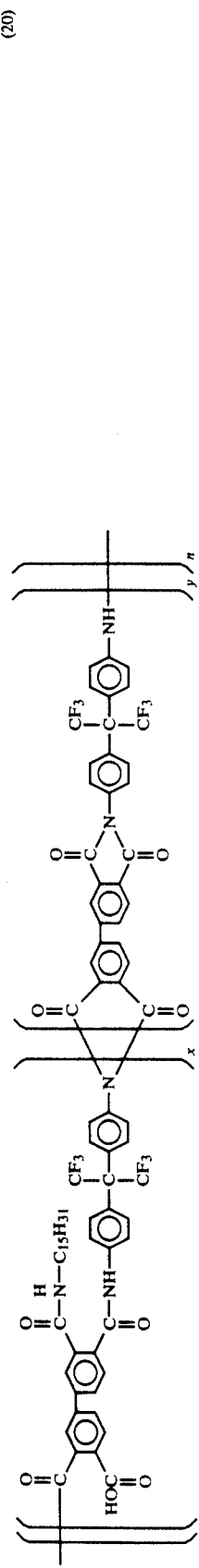
(20)

-continued
(21) 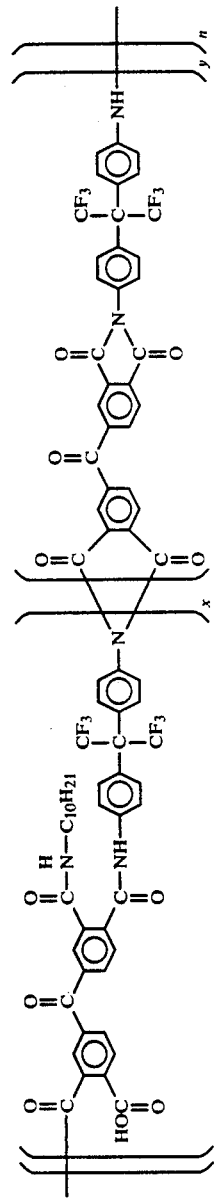
(22) 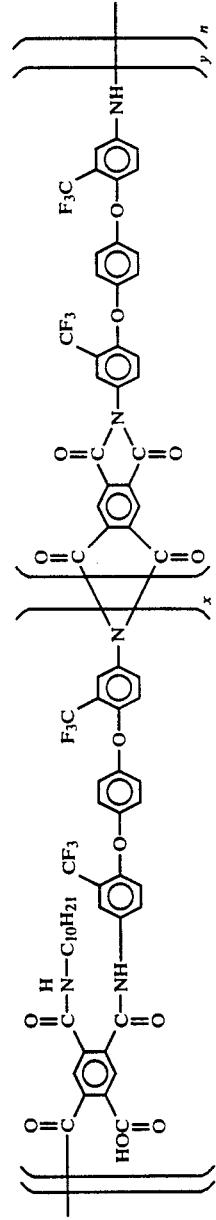
(23) 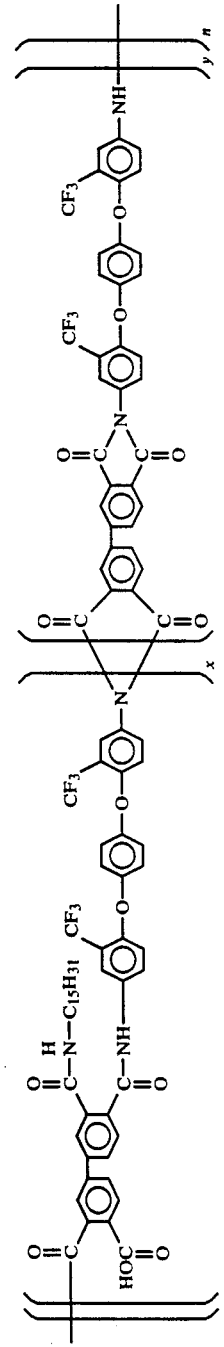
(24) 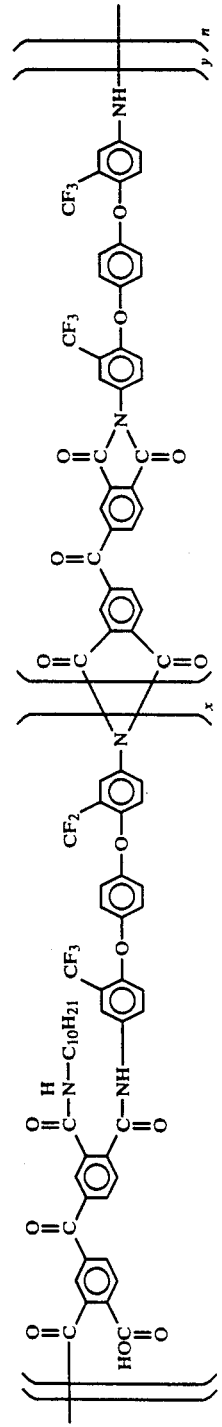

-continued
(25) 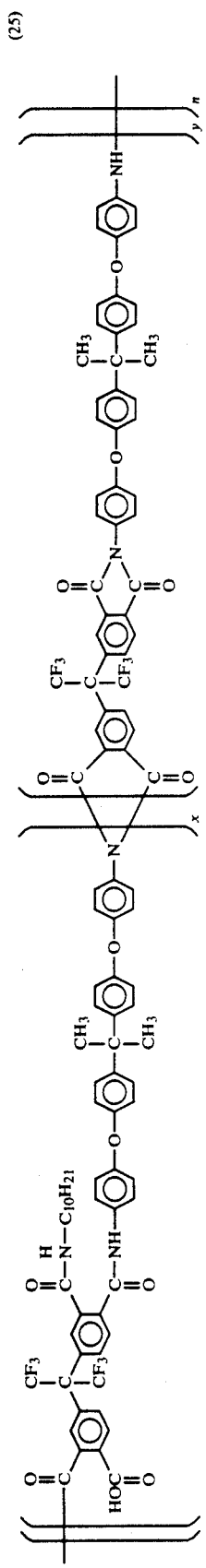
(26) 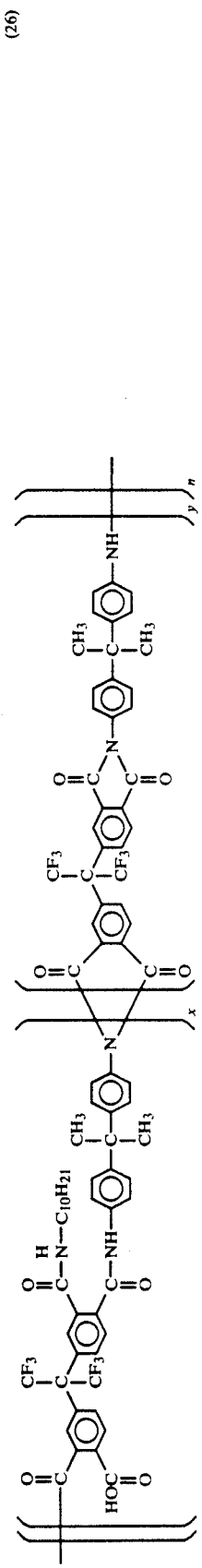
(27) 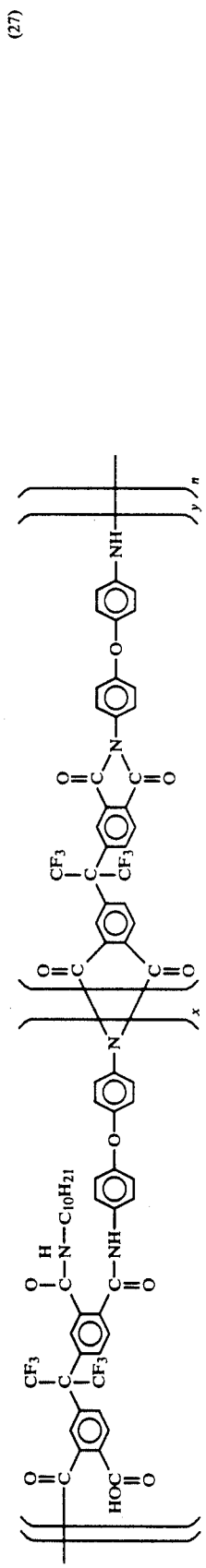
(28) 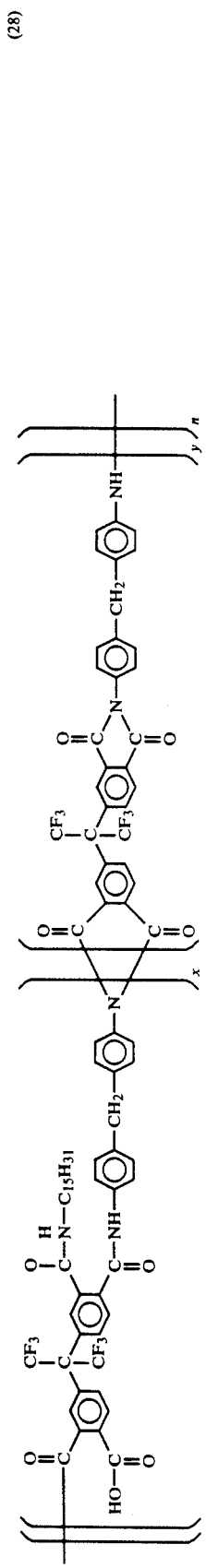

-continued
(29) 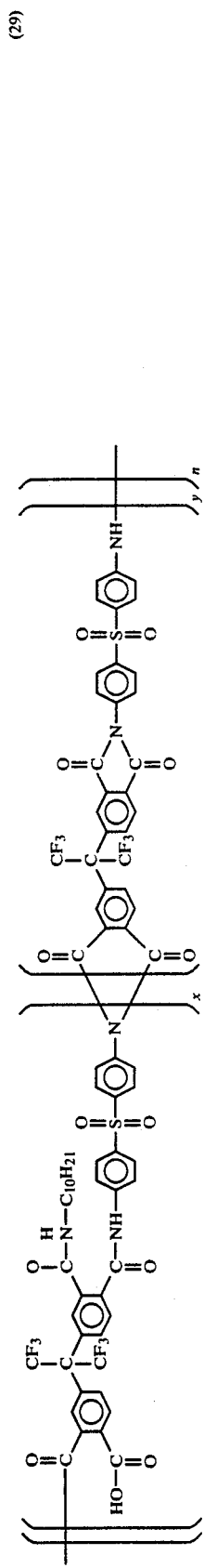 (30) 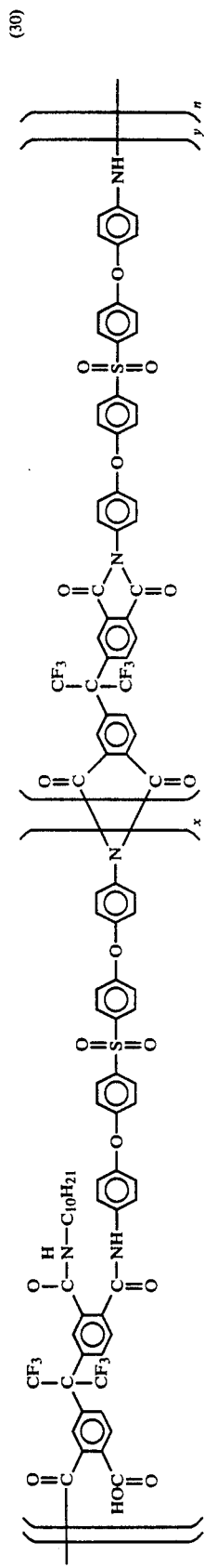 (31) 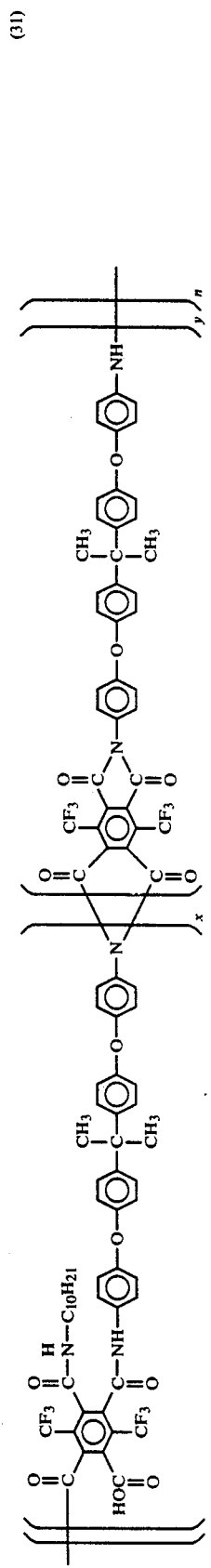 (32) 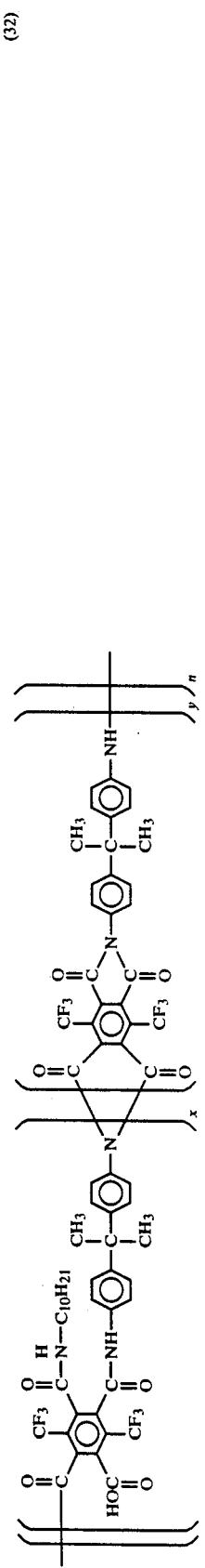

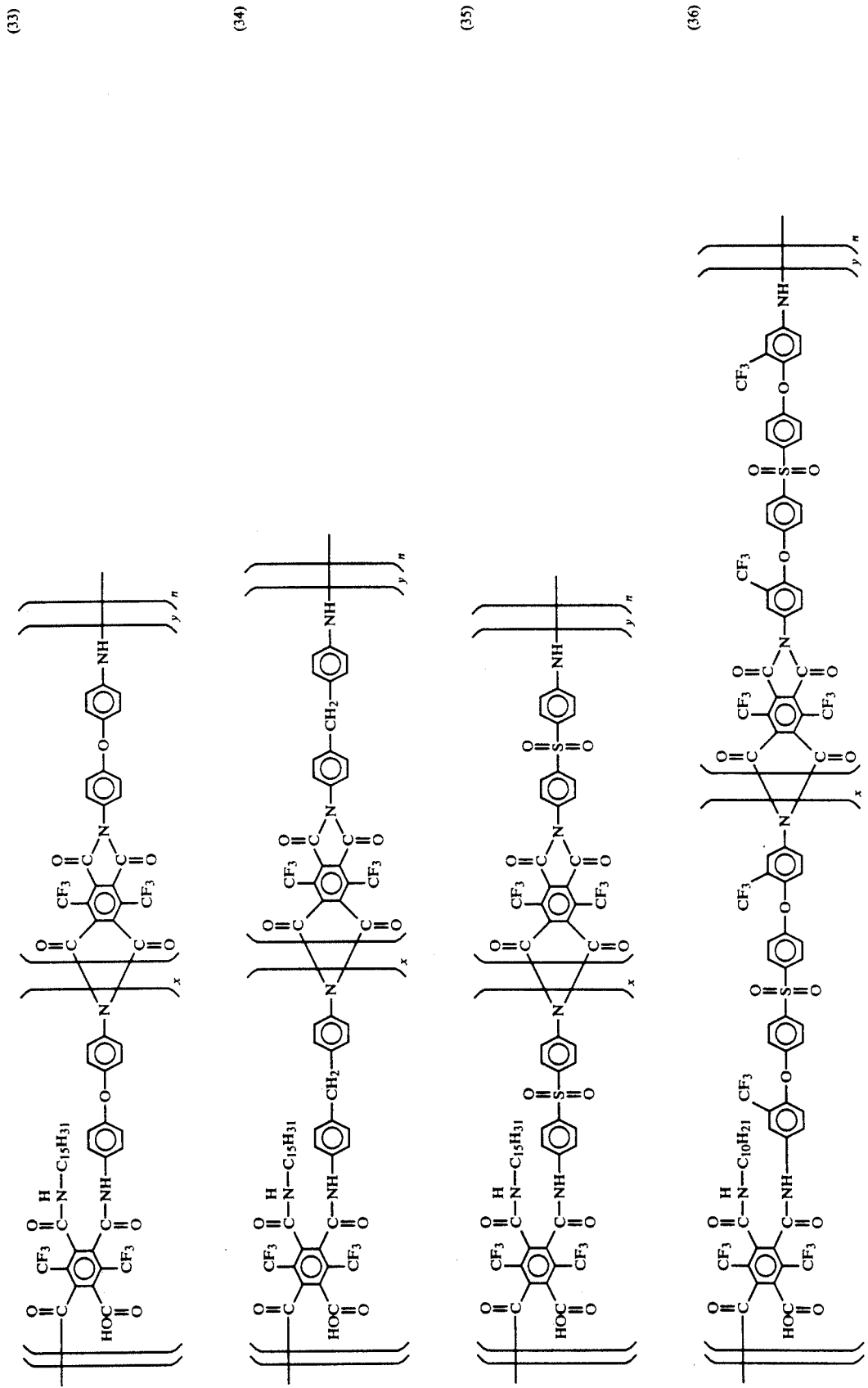

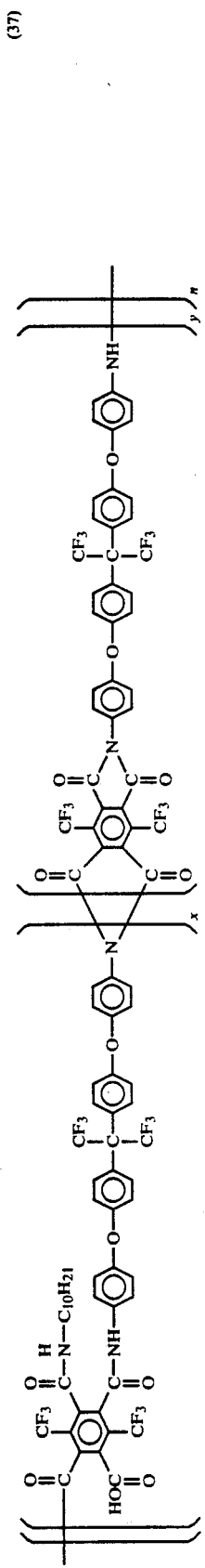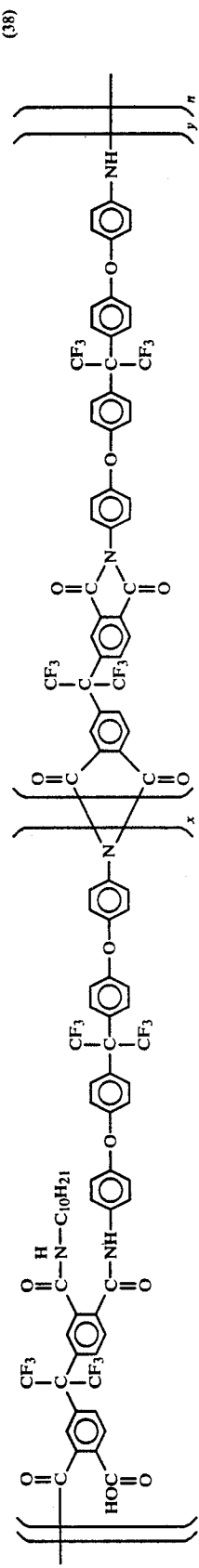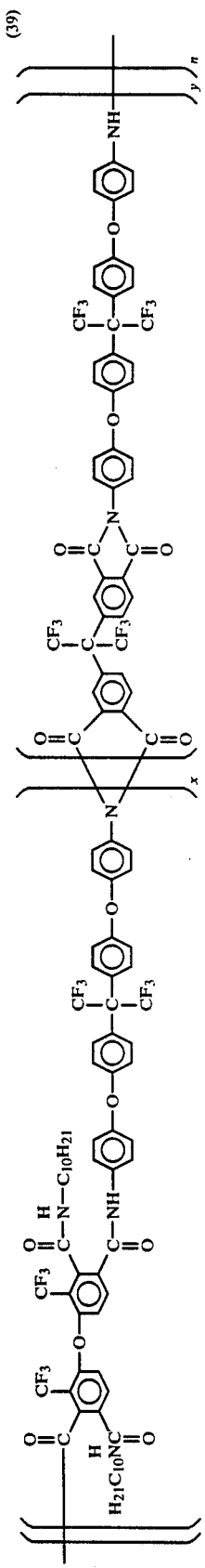

In the above formulae, $x+y=1$, and a part or the whole of the group —COOH can be further cyclized with —CO to form an image ring.

The alignment film comprises a modified polyimide (polyamideimide) obtained by modifying a polyimide as a basic component so as to have a structural unit represented by the formula (I). The molecular weight may suitably range from $10^4$ to $10^5$, preferably from $3\times10^4$ to $8\times10^4$, as measured by GPC (gel permeation chromatography) corresponding to molecular weights of standard polystyrenes in the state of its corresponding polyamic acid. The structural unit represented by the formula (I) may be contained in a % proportion of 0.5–50 wt. %, preferably 0.5–30 wt. more preferably 5–20 wt. %, of the polyamideimide.

The alignment film comprising the polyamideimide may be formed on a substrate by dissolving a polyamide or polyamic acid in a modified form as a precursor to the polyamideimide in a solvent, such as dimethylformamide, dimethylacetamide, dimethyl sulfoxide or N-methylpyrrolidone in a proportion of 0.01–40 wt. %, applying the resultant solution onto the substrate by spinner coating, spray coating or roller coating, and subjecting the coating film to dehydro-cyclization under heating at 100°–350° C., preferably 200°–300° C. The polyimide film thus formed may then be rubbed with a cloth, etc. The polyimide film may be formed in a thickness of, e.g., 30Å–1 micron, preferably 200–2000 Å, so as to also function as an insulating film. In this case, the insulating films 13a and 13b can be omitted. Further, in case of forming the polyimide film on the insulating film 13a or 13b, the polyimide film thickness may be set to 200 Å or less, preferably 100 Å or less.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 microns or longer in cholesteric phase (measured at a mid temperature in the cholesteric range). Preferred examples of such a liquid crystal material may include liquid crystal materials (1)–(5) below comprising the following liquid crystals [A], [B] and [C] in the indicated proportions by weight.

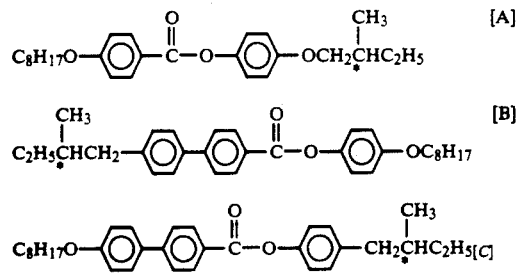

Liquid crystal material
 (1) [A]90/[B]10
 (2) [A]80/[B]20
 (3) [A]70/[B]30
 (4) [A]60/[B]40
 (5) [C]100

Figure 2:
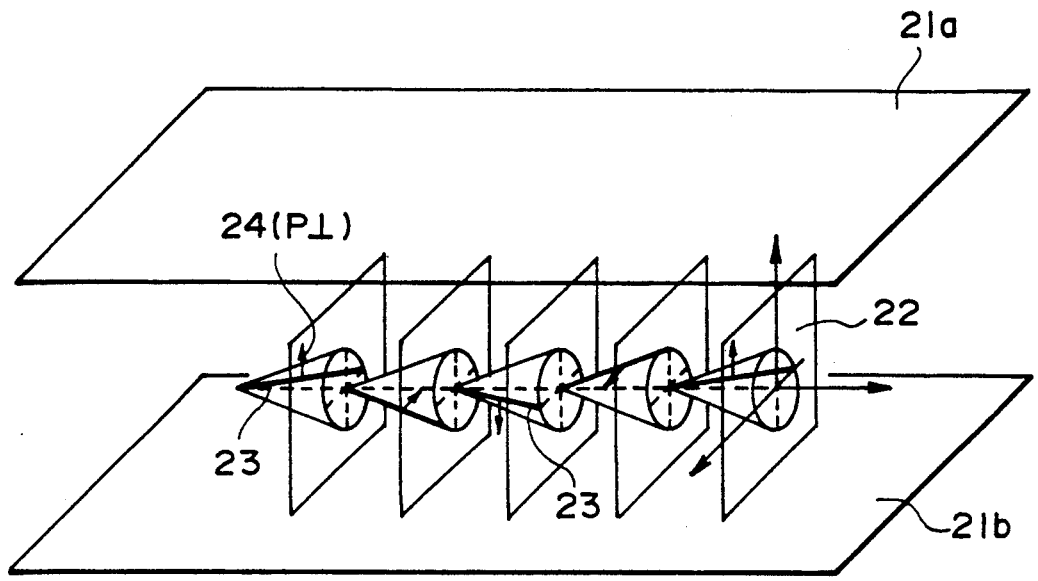
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
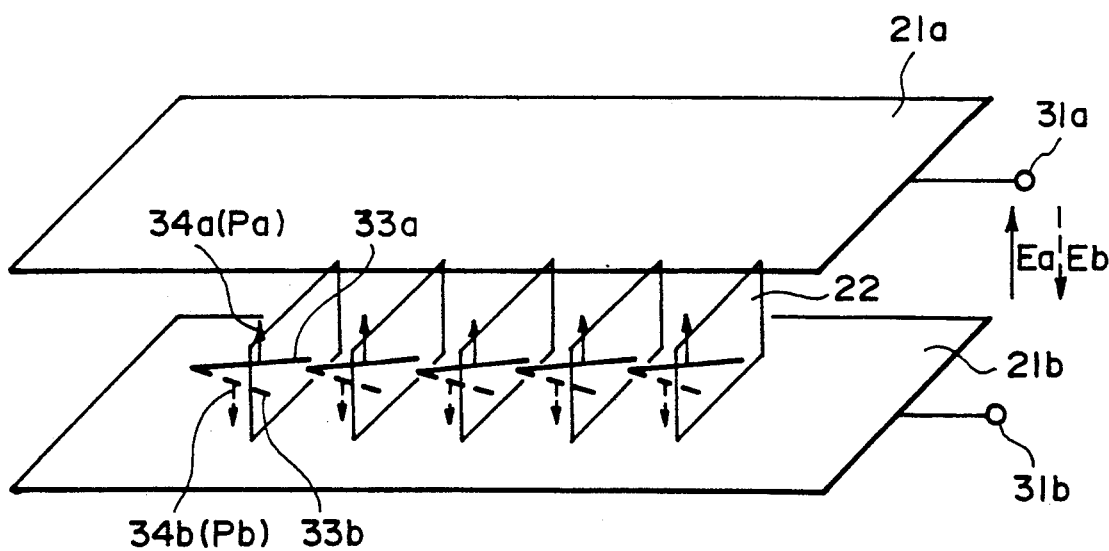
FIG. 3 is a perspective view showing schematically an alignment state of a chiral smectic liquid crystal having a non-helical structure.

Further, when the liquid crystal cell is made sufficiently thin (e.g., 0.1–3 microns, the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4A is a schematic plan view illustrating a tilt angle θ in a uniform (U) alignment state, and FIG. 4B is a schematic plan view illustrating a tilt angle θ in a splay (S) alignment state. In these figures, reference numeral 50 denotes a rubbing axis provided to the above-mentioned polyamideimide film according to the present invention (FIG. 4A) or to a conventional alignment film providing a splay alignment state (FIG. 4B), numeral 51a denotes an average molecular axis in the orientation state $U_1$, numeral 51b denotes an average molecular axis in the orientation state $U_2$, numeral 52a denotes an average molecular axis in the orientation state $S_1$, and numeral 52b denotes an average molecular axis in the orientation state $S_2$. The average molecular axes 51a and 51b can be switched to each other by applying voltages exceeding thresholds of mutually opposite polarities. Similar switching is caused between the average molecular axes 52a and 52b but with a smaller tilt angle $\theta$.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$V_{rev} = 2P_S/(C_i + C_{LC})$$

FIG. 5 is a schematic sectional view illustrating changes in charge distribution direction of $P_S$ and direction of the reverse electric field in a liquid crystal cell. At FIG. 5(a), there is shown a distribution of $\oplus$ and $\ominus$ charges in a memory state before application of a pulse electric field, where the spontaneous polarization is directed from $\alpha$ charges to $\ominus$ charges. At FIG. 5(b) is shown a state immediately after removal of a pulse electric field, when the direction of the spontaneous polarization $P_S$ is opposite to that shown at FIG. 5(a) (thus, the liquid crystal molecules are inverted from one stable orientation state to the other orientation state) but the distribution of the $\oplus$ and $\ominus$ charges is similar to that shown at FIG. 5(a), so that a reverse electric field Vrev is generated as indicated by an arrow shown at FIG. 6(b). The reverse electric field Vrev disappears in a short time to provide a distribution of $\oplus$ and $\ominus$ charges as shown at FIG. 5(c).

Figure 7:
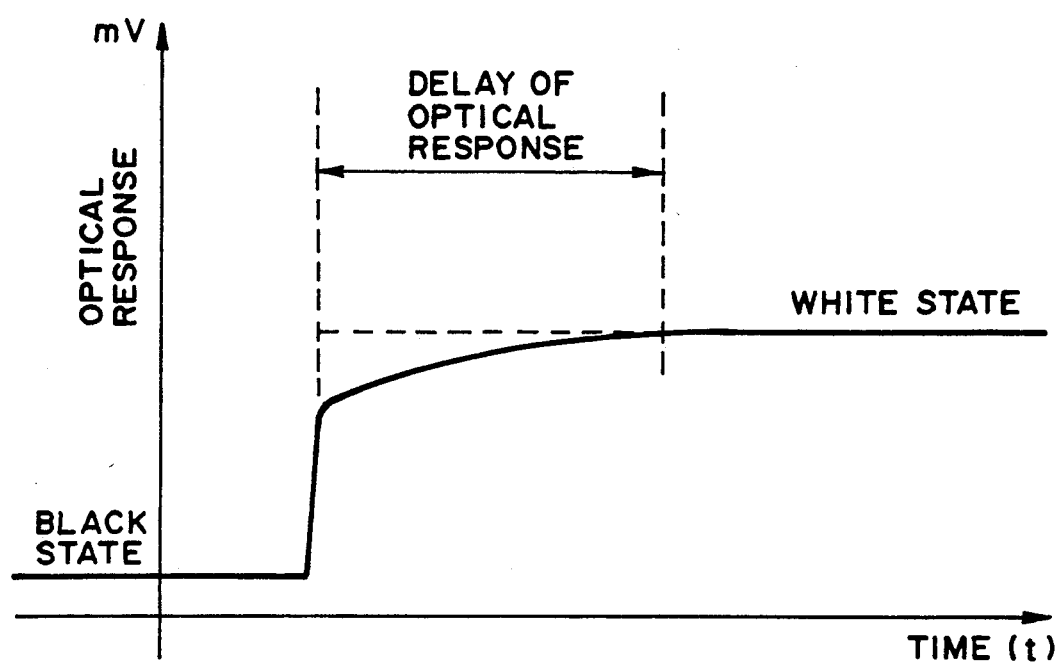
FIGS. 7 and 8 are graphs showing optical response characteristics according to a conventional device and the present invention, respectively.

FIG. 6 is a plan view showing a change in optical response in a splay alignment state given by a conventional polyimide alignment film in terms of a change in tilt angle $\theta$. Referring to FIG. 6, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle $\widehat{H}$ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 5(b). Then, as the reverse electric field Vrev attenuates as shown at FIG. 5(c), the orientation is changed along a path denoted by an arrow $X_3$ to an average molecular axis S(C) in a splay alignment state providing a stable orientation state having a somewhat increased tilt angle $\theta$. An optical response at this time is shown in FIG. 7.

In the alignment state given by using the above-mentioned modified polyimide (polyamideimide) film of the present invention, the average molecular axes S(A), S(B) and S(C) in the splay alignment state shown in FIG. 6 are not caused but it is possible to form an alignment state with an average molecular axis giving a tilt angle $\theta$ which is close to a maximum tilt angle $\widehat{H}$. An optical response at this time according to the present invention is shown in FIG. 8.

Thus, the above-mentioned uniform alignment state can be formed by using the alignment film according to the present invention. Further to say, if a polyimide containing a fluorine atom in its group $R_1$ or $R_2$ in the formula (I), such as example compounds (13)–(39) described above, is used, it is possible to provide a liquid crystal device which can readily assume a uniform alignment state and have a high contrast by itself. If example compounds (1)–(12) are used, it is desirable to effect an AC application treatment after the preparation of a liquid crystal cell.

The AC used for this purpose may have a voltage of 5–100 volts, preferably 15–50 volts, and a frequency of 10–500 Hz, preferably 10–200 Hz. The AC application treatment may be performed for a period of several seconds to about 10 minutes.

Figure 8:
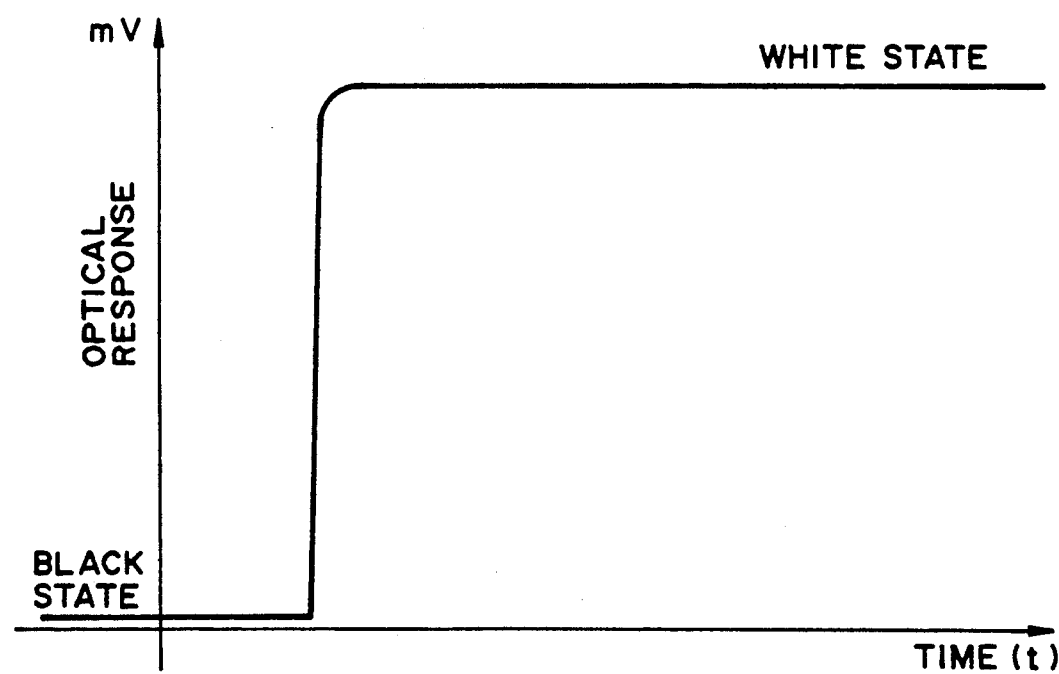

Further, according to FIG. 8, it is shown that a delay in optical response causing after-image is obviated. Thus, the alignment film according to the present invention is effective in preventing after-image.

Hereinbelow, the present invention will be described based on Examples.

EXAMPLE 1

25.9 g (0.05 mol) of 2,2-bis[4-(4-aminophenoxy)phenyl] hexafluoropropane, 0.78 g (0.005 mol) of n-decylamine and 10.9 g (0.05 mol) were dissolved in 380 g of N-methylpyrrolidone (NMP) and reacted for 6 hours at room temperature to prepare a solution of a polyamic acid represented by the following formula:

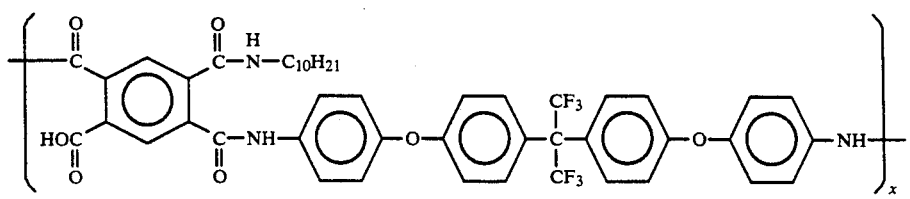

-continued

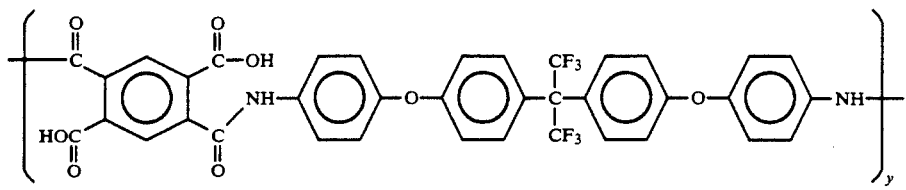

X ≈ 0.1   x + y = 1   Mn ≈ 50000

Then, the polyamic acid solution was diluted with an N-methylpyrrolidone/n-butyl cellulose=2/1 mixture to prepare a 3.0 wt. % solution, which was then applied onto two 1.1 mm-thick glass plates each provided with ITO stripes by a spinner rotating at 3000 rpm for 30 sec.

After the film formation, the film was cured under heating at 250° C. for about 1 hour. The resultant polyimide film constituting the alignment film may be represented by the following formula:

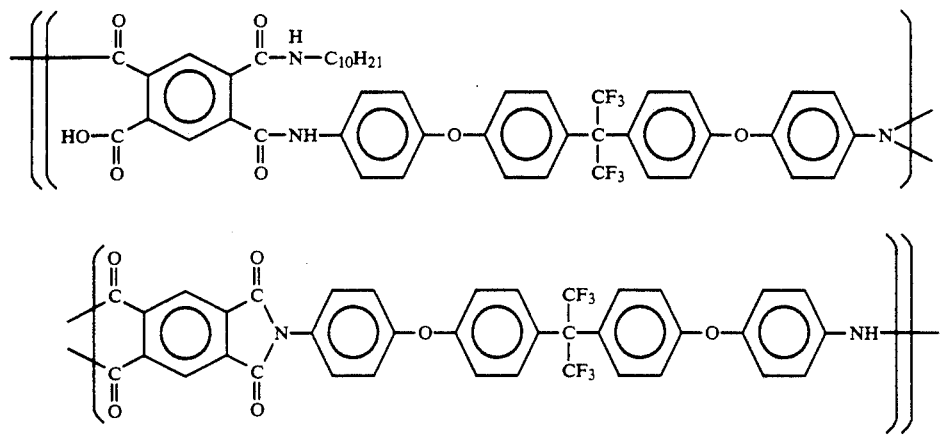

wherein the COOH group may be further cyclized.

The resultant film had a thickness of 400 Å and as subjected to rubbing in one direction with nylon fiber-planted cloth.

The blank cell was filled with a ferroelectric smectic liquid crystal ("CS-1014" (trade name), available from Chisso K.K.) in isotropic phase under vacuum and, after sealing, was gradually cooled a rate of 0.5° C./min. to 30° C., whereby alignment was effected. The "CS-1014" liquid crystal in the cell showed the following phase transition series.

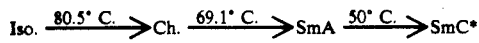

Iso.:isotropic phase,
Ch.:cholesteric phase,
SmA:smectic A phase,
SmC* chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=15 degrees, transmittance in the brightest state=36 %, transmittance in the darkest state=1.2 %, contrast ratio=30:1.

The delay in optical response causing after-image was 0.2 sec or less.

Figure 9:
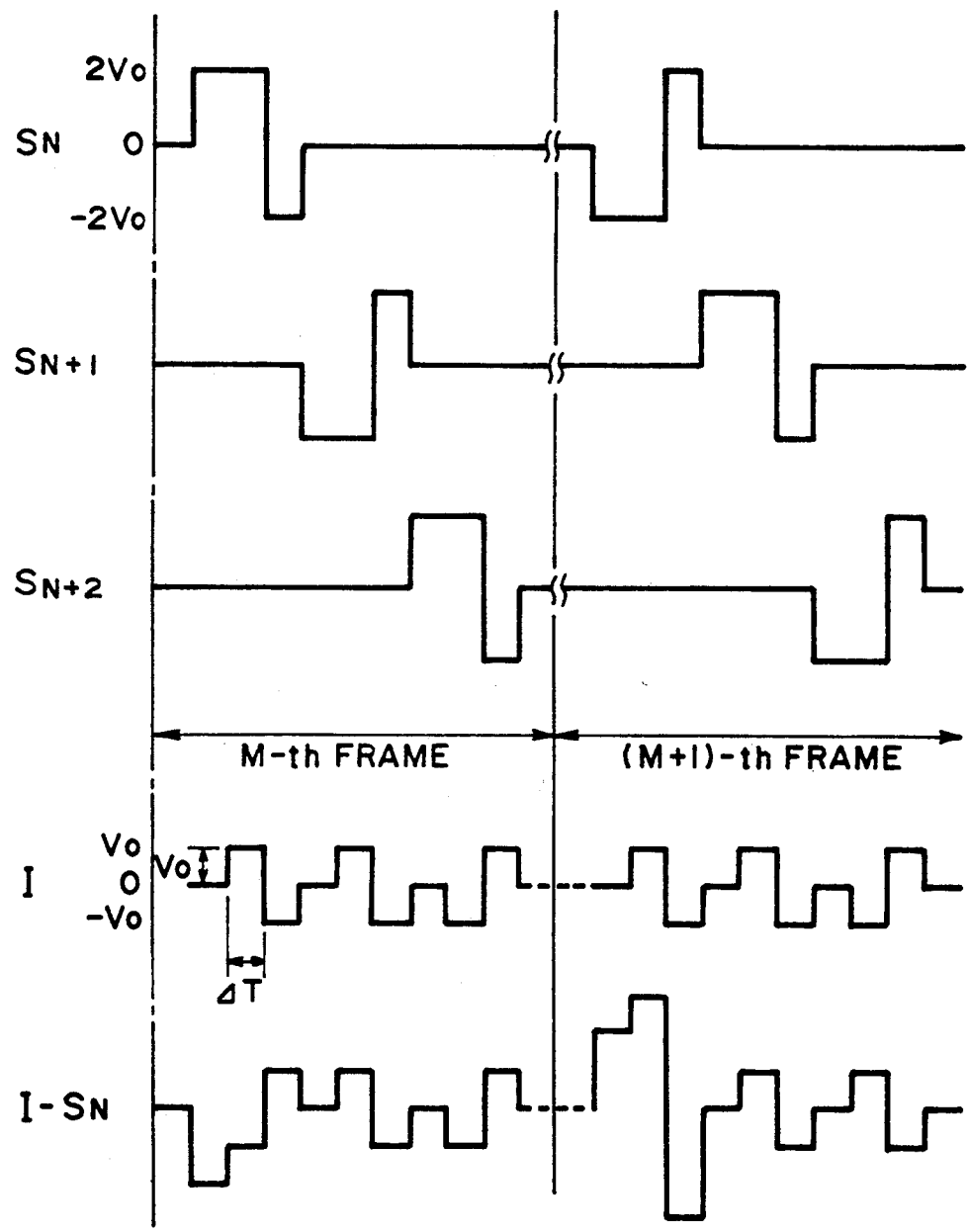
FIG. 9 is a waveform diagram illustrating driving waveforms used in an embodiment of the present invention.

The liquid crystal device was subjected to multiplexing drive for display using driving waveforms shown in FIG. 9, whereby a high-quality display with a high contrast was attained. Further, after an image display of a prescribed character image, the whole picture area was erased into "white", whereby no after-image was recognized. Referring to FIG. 9, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5-8 volts and T=20-70 μsec.

EXAMPLE 2

A liquid crystal cell was prepared in the same manner as in Example 1 except that the alignment film was composed of a polyamideimide represented by the above-raised example formula (1) (wherein x=0.1, y=0.9, Mn (molecular weight as measured by GPC (gel permeation chromatography) corresponding to those of standard polystyrenes in the state of a polyamic acid) ≈50,000).

The liquid crystal cell was subjected to 1 min. of a pretreatment by applying a high-voltage AC with a voltage of 20 volts and a frequency of 50 Hz. Thereafter, the cell was subjected to the measurement of a contrast ratio and a response time in the same manner as in Example 1 to result in a contrast ratio of 26:1 and a delay time of 0.3 sec.

EXAMPLES 3-7

Liquid crystal cells were prepared in the same manner as in Example 1 except that the alignment control films shown in Table 1 below (wherein the group OH at the leftmost part in each formula might be removed by further cyclization) were used and the "CS-1014" liquid crystal was used in Examples 3-5 and the liquid crystal material (3) described hereinbefore was used in Examples 6-7.

The respective cells were tested in the same manner as in Example 1, whereby measured data of contrast ratio and delay time in optical response shown in Table 2 appearing hereinafter were obtained.

The respective cells were subjected to the multiplexing drive for display in the same manner as in Example 1, whereby similar results were attained with respect to contrast and after-image.

TABLE 1
| Example | Alignment film |
|---|---|
| 3 | 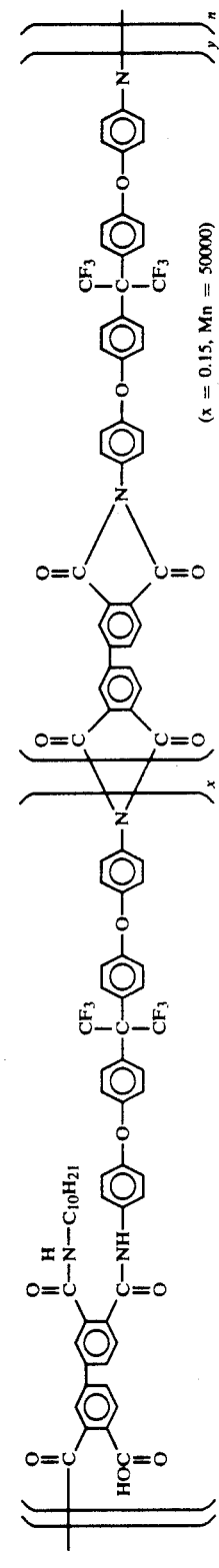 (x = 0.15, Mn = 50000) |
| 4 | 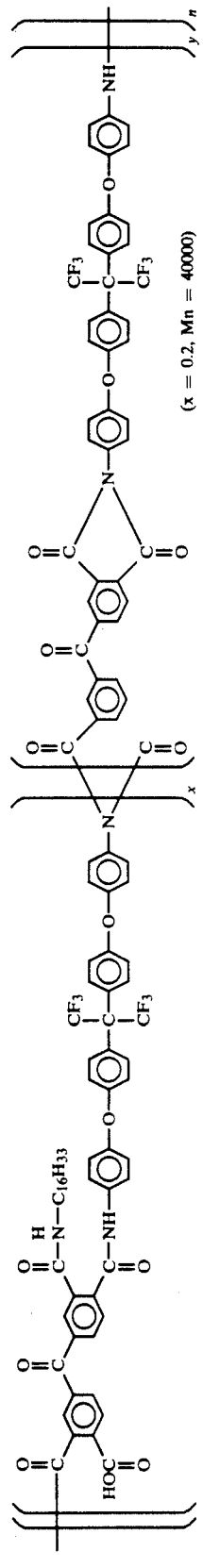 (x = 0.2, Mn = 40000) |
| 5 | 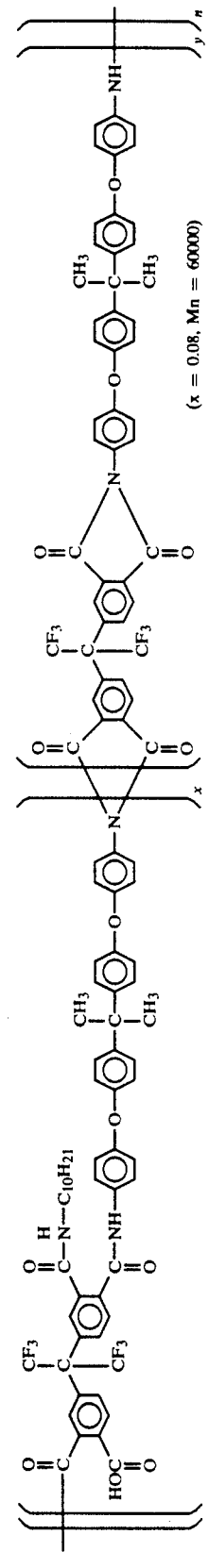 (x = 0.08, Mn = 60000) |
| 6 | 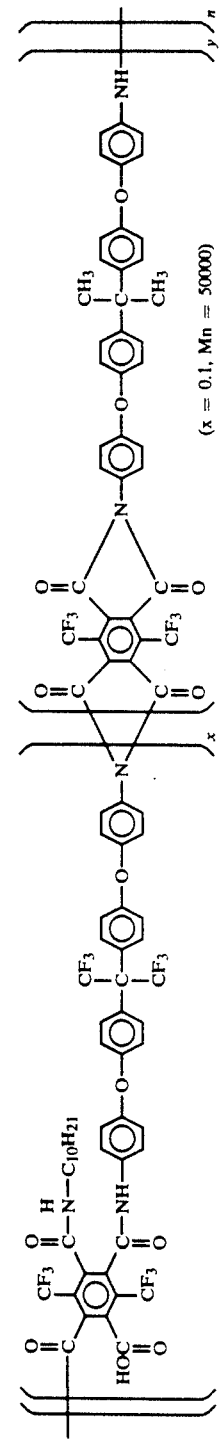 (x = 0.1, Mn = 50000) |

TABLE 1-continued
| Example | Alignment film |
|---|---|
| 7 | 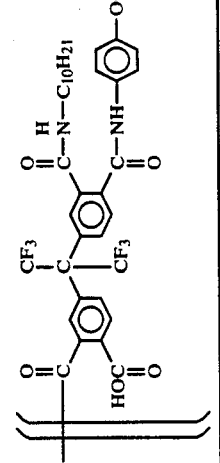 |

TABLE 2

| Example | Contrast ratio | Delay in optical response (sec) |
|---------|----------------|----------------------------------|
| 3 | 20:1 | 0.1 |
| 4 | 25:1 | 0.3 |
| 5 | 22:1 | 0.2 |
| 6 | 28:1 | 0.3 |
| 7 | 27:1 | 0.3 |

COMPARATIVE EXAMPLES 1–4

Liquid crystal cells were prepared in the same manner as in Example 1 except that the alignment control films shown in Table 3 below were used, and the "CS-1014" liquid crystal was used in Comparative Examples 1 and 3 and the liquid crystal material (3) was used in Comparative Examples 2 and 4. The measured data of contrast ratio and delay in optical response measured for each of the cells are shown in Table 4

The respective cells were subjected to the multiplexing drive for display in the same manner as in Example 1, whereby the resultant contrasts were smaller that given by Example 1 and after-image was recognized for each cell.

TABLE 3
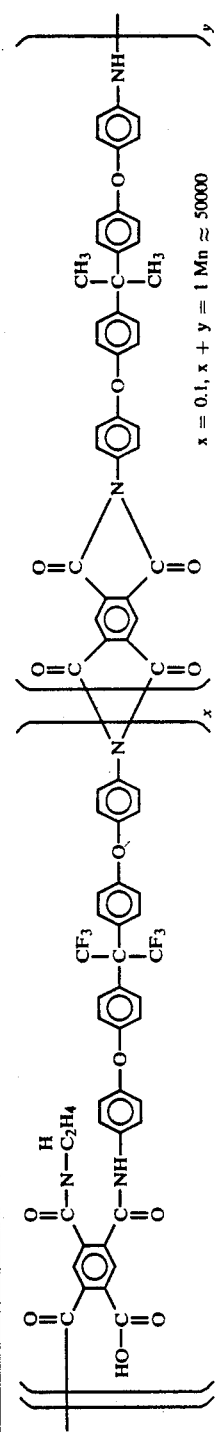

TABLE 4

| Comp. Example | Contrast ratio | Delay in optical response (sec) |
| --- | --- | --- |
| 1 | 20:1 | 0.6 |
| 2 | 21:1 | 0.7 |
| 3 | 15:1 | 1.0 |
| 4 | 17:1 | 1.2 |

As is apparent from the above Examples and Comparative Examples, according to the present invention, there is obtained a liquid crystal device which provides a high-quality display including a high contrast between the bright and dark states, particularly a very large display contrast at the time of multiplexing drive and is free from ugly after-image.

What is claimed is:

1. A liquid crystal device, comprising: a pair of substrates and a chiral smectic liquid crystal disposed between the substrates; at least one of said pair of substrates having thereon an alignment film comprising a polyimide which contains a structural unit represented by the following formula (I):

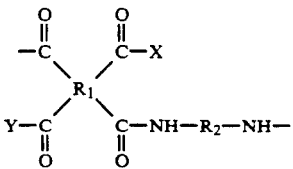

wherein $R_1$ denotes a tetravalent organic residue group, $R_2$ denotes a divalent organic residue group, X denotes $-NHR_3$ or $-OH$, $R_3$ denotes an alkyl group having 5-20 carbon atoms, Y denotes $-NHR_4$ or $-OH$, and $R_4$ denotes an alkyl group having 5-20 carbon atoms with the proviso that both X and Y cannot be $-OH$ and the $-OH$ in X or Y can be removed by further cyclization.

2. A device according to claim 1, wherein at least one of $R_1$ and $R_2$ in the structural unit represented by the formula (I) contains a fluorine 3. A device according to claim 1, wherein the structural unit represented by the formula (I) is contained in a proportion of 0.5-30 wt. % in the polyimide.

4. A device according to claim 1, wherein the polyimide has a molecular weight of $10^4$ to $10^5$ as measured by GPC (gel permeation chromatography) for a corresponding polyamic acid.

5. A method for driving a liquid crystal device, comprising subjecting the liquid crystal device according to claim 1 to multiplexing drive.

* * * * *

UNITED STATES PATENT AND TRADEMARK OFFICE
CERTIFICATE OF CORRECTION

PATENT NO. : 5,250,330
DATED : October 5, 1993
INVENTOR(S) : MASANOBU ASAOKA, ET AL.

Page 1 of 3

It is certified that error appears in the above-identified patent and that said Letters Patent is hereby corrected as shown below:

COLUMN 1

Line 11, "thruogh" should read --through--.

COLUMN 2

Line 2, "example" should read --example.--.
Line 10, "tile" should read --tilt--.
Line 51, "p.p." should read --pp.--.
Line 68, "(I)" should be deleted.

COLUMN 4

Line 39, "subject-" should read --subject--.
Line 40, "ing" should be deleted.
Line 42, "along-chain" should read --a long-chain--.

COLUMN 14

Formula (15), "  " should read -- 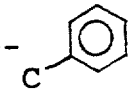 --.

COLUMN 15

Formula (18), " 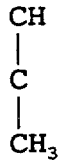 " should read -- 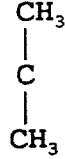 --.

UNITED STATES PATENT AND TRADEMARK OFFICE
CERTIFICATE OF CORRECTION

PATENT NO. : 5,250,330
DATED : October 5, 1993
INVENTOR(S) : MASANOBU ASAOKA, ET AL.　　　　　Page 2 of 3

It is certified that error appears in the above-identified patent and that said Letters Patent is hereby corrected as shown below:

COLUMN 18

Formula (24), "$CF_2$" should read --$CF_3$--.

COLUMN 20

Formula (27), "$\begin{smallmatrix} O \\ | \phantom{x} H \\ C\!-\!N \end{smallmatrix}$" should read --$\begin{smallmatrix} O \\ \| \phantom{x} H \\ C\!-\!N \end{smallmatrix}$--.

Formula (28), "$\begin{smallmatrix} O \\ | \phantom{x} H \\ C\!-\!N \end{smallmatrix}$" should read --$\begin{smallmatrix} O \\ \| \phantom{x} H \\ C\!-\!N \end{smallmatrix}$--.

COLUMN 21

Formula (29), "$\begin{smallmatrix} O \\ | \phantom{x} H \\ C\!-\!N \end{smallmatrix}$" should read --$\begin{smallmatrix} O \\ \| \phantom{x} H \\ C\!-\!N \end{smallmatrix}$--.

Formula (30), "$\begin{smallmatrix} O \\ | \phantom{x} H \\ C\!-\!N \end{smallmatrix}$" should read --$\begin{smallmatrix} O \\ \| \phantom{x} H \\ C\!-\!N \end{smallmatrix}$--.

COLUMN 27

Line 13, "%" should be deleted.
Line 68, "of," should read --of, e.g.,--.

COLUMN 29

Line 31, "α charges" should read --⊕ charges--.

UNITED STATES PATENT AND TRADEMARK OFFICE
CERTIFICATE OF CORRECTION

PATENT NO. : 5,250,330
DATED : October 5, 1993
INVENTOR(S) : MASANOBU ASAOKA, ET AL.

It is certified that error appears in the above-identified patent and that said Letters Patent is hereby corrected as shown below:

COLUMN 32

Line 49, "date" should read --data--.

COLUMN 40

Line 6, "Table 4" should read --Table 4 below.--.
   Line 10, "that" should read --than that--.

Signed and Sealed this

Twenty-third Day of August, 1994

Attest:

BRUCE LEHMAN

Attesting Officer    Commissioner of Patents and Trademarks